(12) United States Patent
Li

(10) Patent No.: US 6,408,912 B1
(45) Date of Patent: Jun. 25, 2002

(54) BICYCLE WHEEL ASSEMBLY

(76) Inventor: Cheng-Yu Li, No. 323, Chung-Hua Rd., Nantou City (TW)

( * ) Notice: Subject to any disclaimer, the term of this patent is extended or adjusted under 35 U.S.C. 154(b) by 0 days.

(21) Appl. No.: 09/905,314

(22) Filed: Jul. 13, 2001

(51) Int. Cl.[7] .......................... B60C 25/00; B60C 7/00; B60C 5/16; B60C 7/24
(52) U.S. Cl. ...................... 152/393; 152/323; 152/247; 152/283
(58) Field of Search .............................. 152/393, 394, 152/323, 11, 12, 5, 7, 247, 270, 280, 282, 283

(56) References Cited

U.S. PATENT DOCUMENTS

| | | | | |
|---|---|---|---|---|
| 633,539 A | * | 9/1899 | Wheeler | 152/323 |
| 696,771 A | * | 4/1902 | Sweet | 152/388 |
| 702,432 A | * | 6/1902 | Huffman | 152/384 |
| 772,818 A | * | 10/1904 | Olsen | 152/168 |
| 1,162,158 A | * | 11/1915 | Haaker | 152/168 |
| 1,365,350 A | * | 1/1921 | Sloper | 152/389 |
| 1,489,237 A | * | 4/1924 | Donham | 152/327 |
| 4,446,903 A | * | 5/1984 | Clinefelter et al. | 152/323 |

* cited by examiner

Primary Examiner—S. Joseph Morano
Assistant Examiner—Jason R. Bellinger
(74) Attorney, Agent, or Firm—Brinks Hofer Gilson & Lione

(57) ABSTRACT

A bicycle wheel assembly includes a hub disposed coaxially in a metal rim. A spoke unit interconnects the hub and the metal rim. The metal rim defines a tire-retention groove to receive a foam tire therein. The foam tire has an inner section disposed in the groove of the metal rim, and an outer section that projects outwardly from the groove. A tire reinforcing unit is embedded within the foam tire, and includes a non-stretchable strap embedded in the inner section of the foam tire and disposed around the metal rim, and a plurality of angularly spaced apart rigid strings which extend radially from the non-stretchable strap into the outer section of the foam tire.

3 Claims, 4 Drawing Sheets

BICYCLE WHEEL ASSEMBLY

BACKGROUND OF THE INVENTION

1. Field of the Invention

The invention relates to a bicycle wheel assembly, more particularly to a bicycle wheel assembly with a foam tire.

2. Description of the Related Art

FIG. 1 illustrates a conventional bicycle wheel assembly 1 which includes a metal rim 101 defining a tire-retention groove, a hub 102 disposed coaxially in the metal rim 101, a plurality of spokes 103 interconnecting the hub 102 and the metal rim 101, and an inflatable tire 104 disposed in the tire-retention groove of the metal rim 101.

The aforesaid conventional wheel assembly 1 is disadvantageous in that the tire 104 is vulnerable to puncture.

SUMMARY OF THE INVENTION

Therefore, the main object of this invention is to provide a bicycle wheel assembly with a non-inflatable foam tire so as avoid the aforementioned disadvantage which results from the use of the conventional bicycle wheel assembly.

Accordingly, a bicycle wheel assembly of the present invention includes an annular metal rim, a hub, a plurality of spokes, a non-inflatable foam tire, and a tire reinforcing unit. The metal rim includes an annular spoke-mounting wall, and left and right annular tire-clamping walls which extend radially and outwardly from two opposite sides of the spoke-mounting wall to define a tire-retention groove thereamong. The hub is coaxially disposed within the spoke-mounting wall of the metal rim. The spokes interconnect the hub and the spoke-mounting wall of the metal rim. The foam tire is disposed in the tire-retention groove of the metal rim, and has an annular inner section clamped fixedly by the tire-clamping walls, and an annular outer section which projects outwardly and radially from the tire-retention groove. The tire reinforcing unit is embedded within the foam tire, and includes an annular non-stretchable strap which is embedded in the inner section of the foam tire and which is disposed around the spoke-mounting wall, and a plurality of angularly spaced apart rigid strings which extend radially from the non-stretchable strap into the outer section of the foam tire.

Preferably, each of the spokes has an anchor end which is disposed in the tire-retention groove of the metal rim, which abuts tightly against the spoke-mounting wall and which is formed with a through-hole. The strap passes fittingly through the through-holes in the anchor ends of the spokes.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
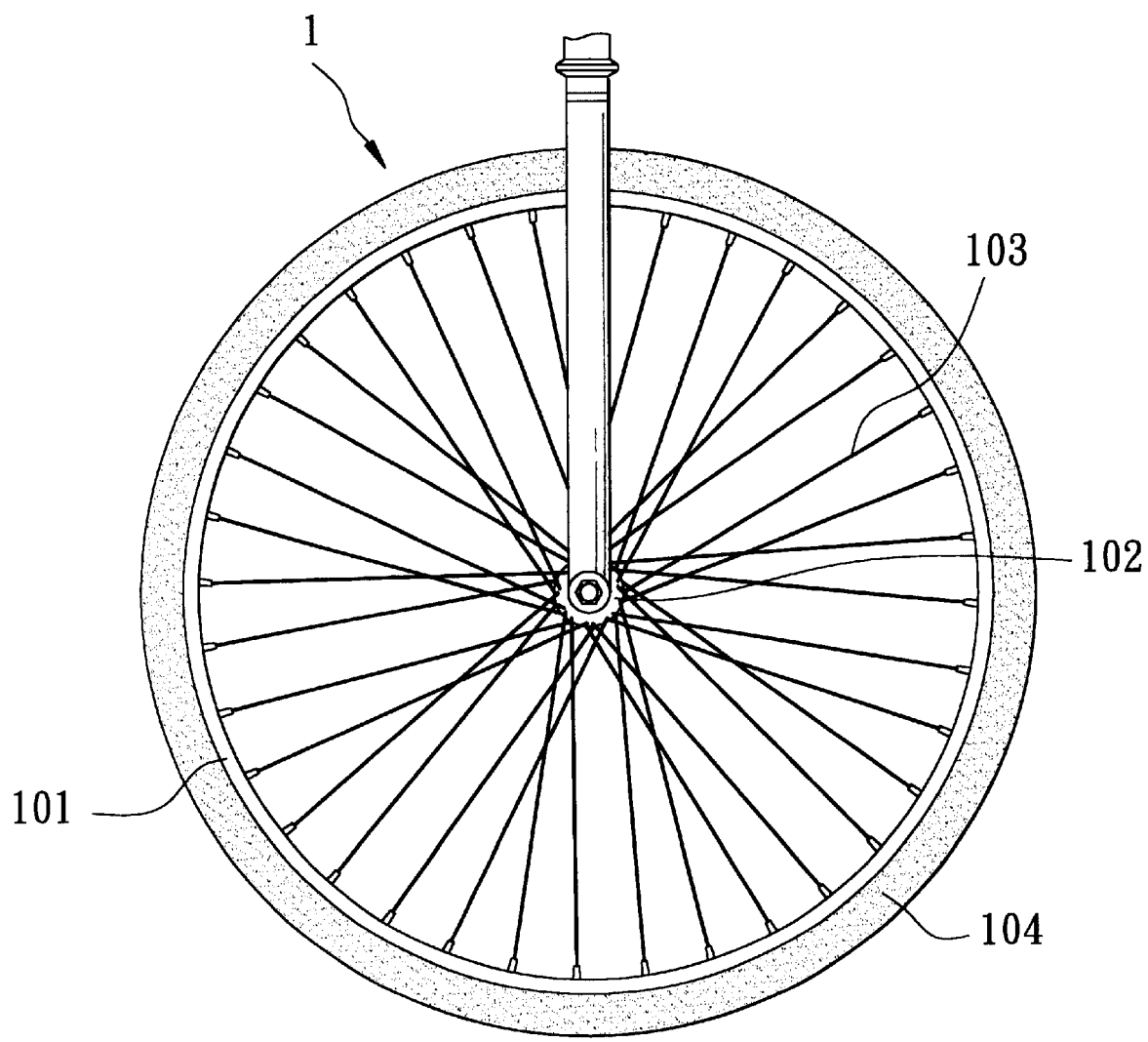
FIG. 1 is a schematic side view of a conventional bicycle wheel assembly.
Figure 2:
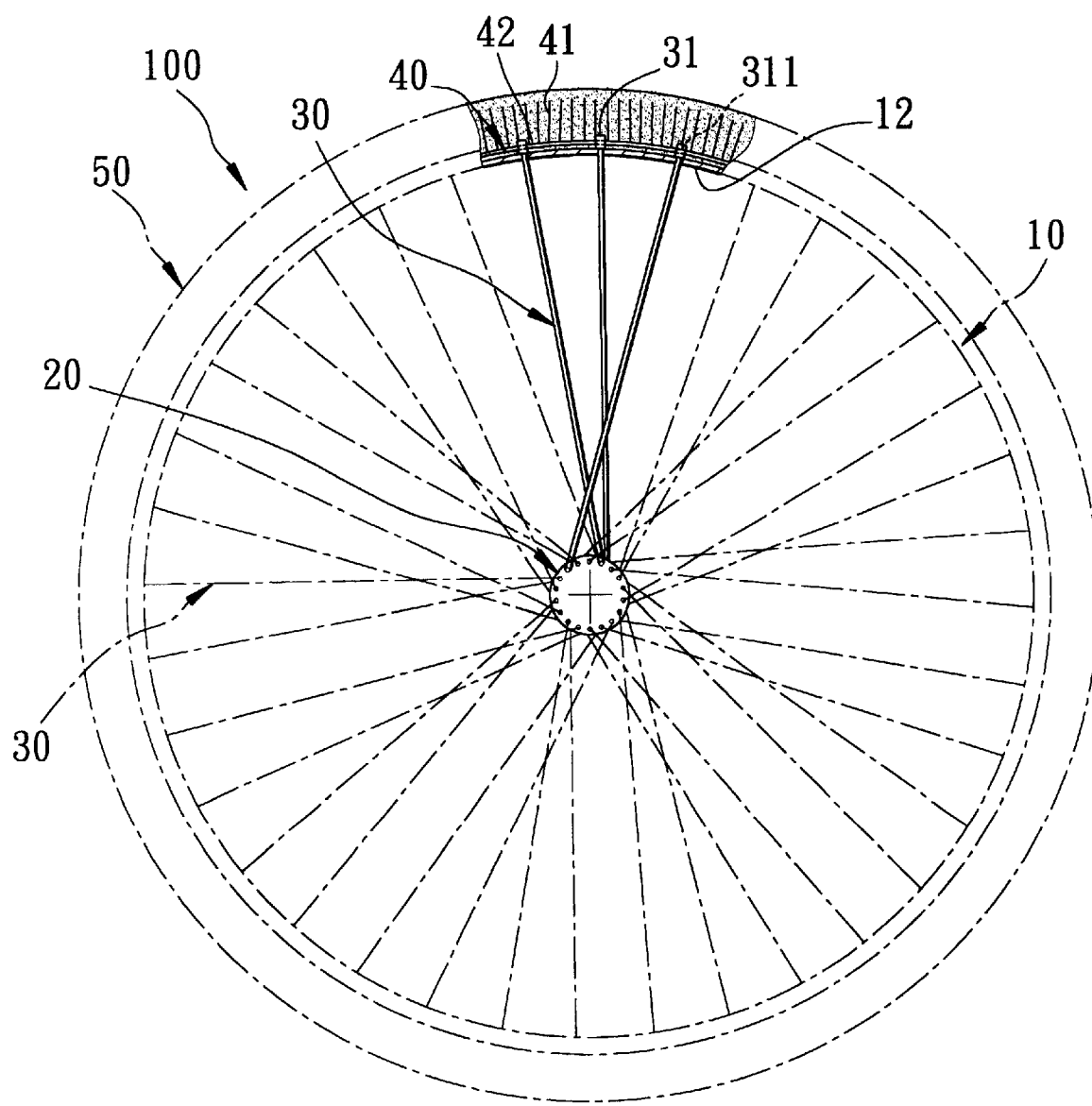
FIG. 2 is a schematic side view of a preferred embodiment of a bicycle wheel assembly of the present invention.
Figure 3:
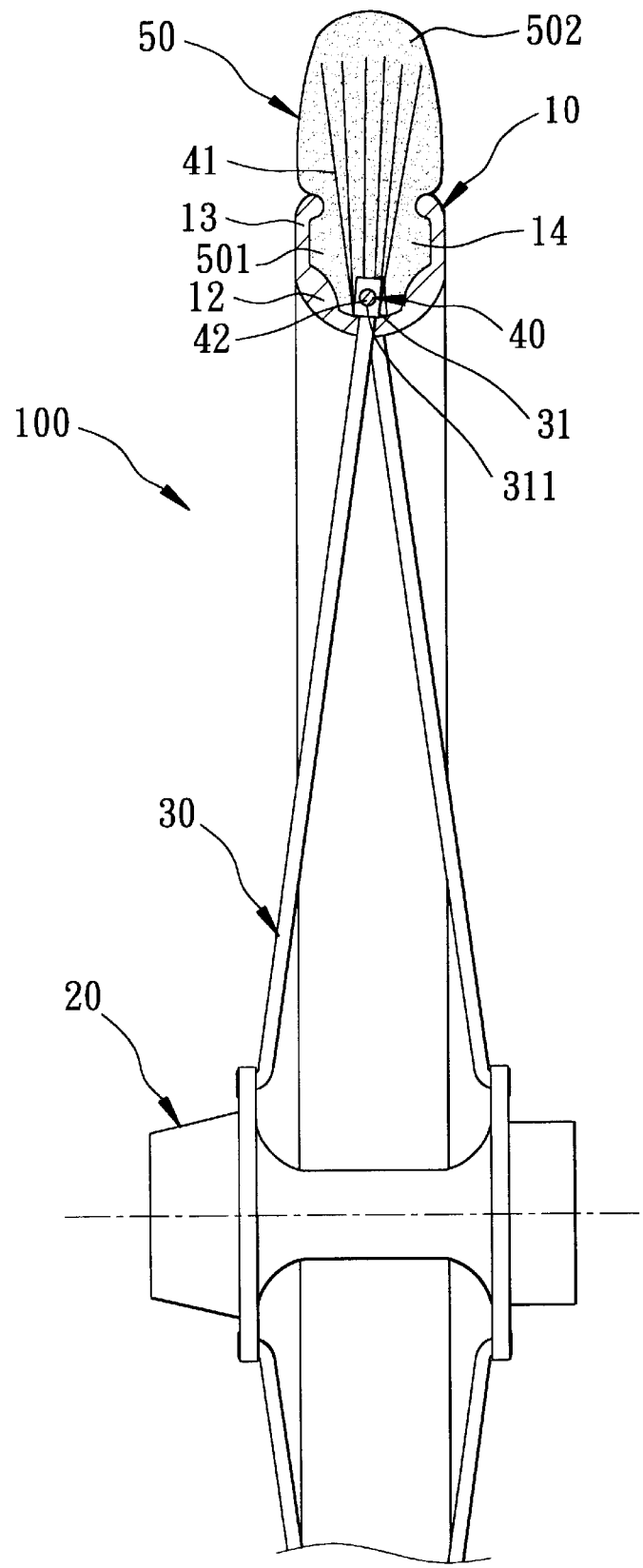
FIG. 3 is a fragmentary partly cross-sectional view of the preferred embodiment.
Figure 4:
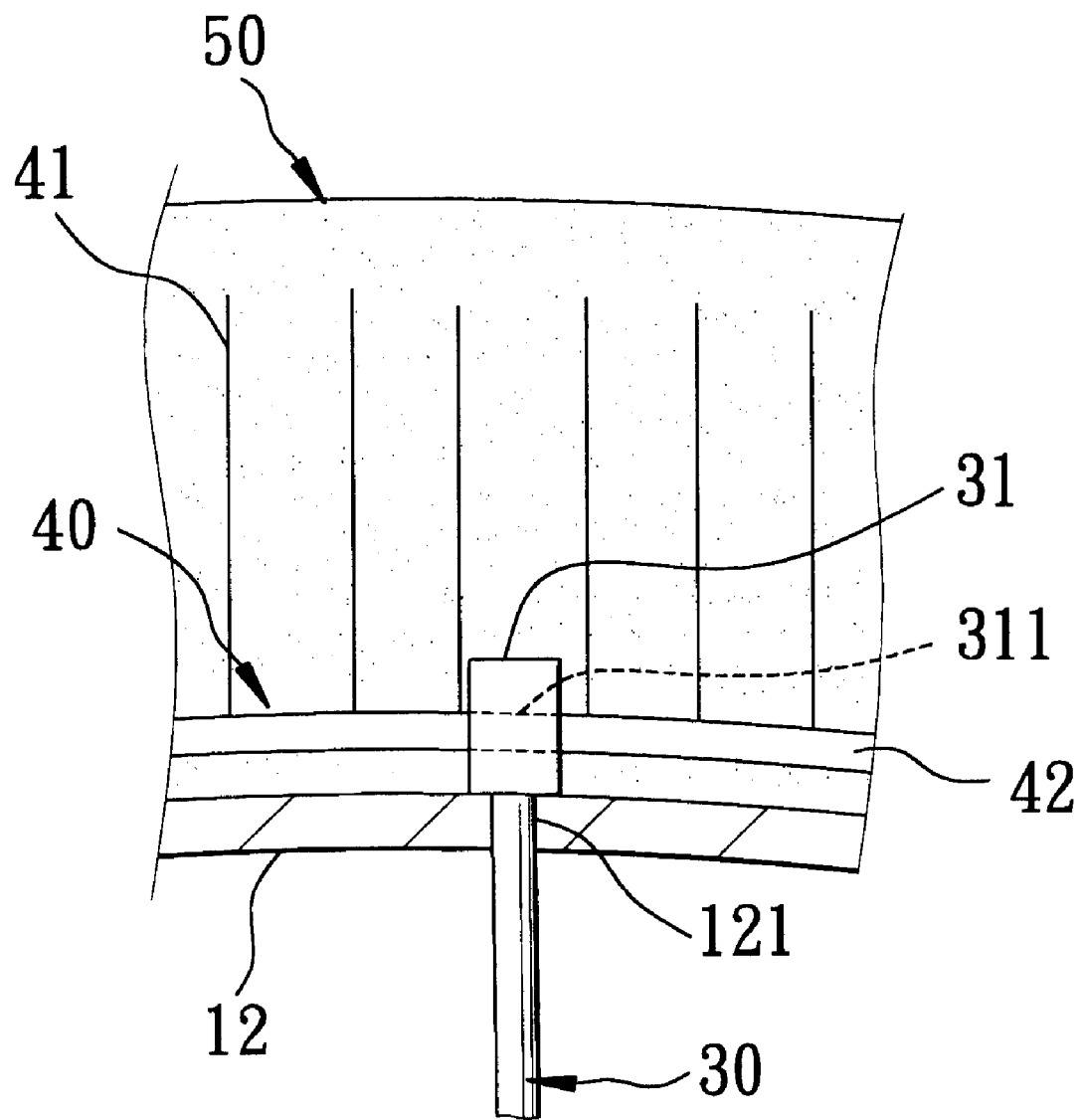
FIG. 4 is another fragmentary partly cross-sectional view of the preferred embodiment viewed from another angle.

Referring to FIGS. 2 to 4, the preferred embodiment of a bicycle wheel assembly 100 of the present invention is shown to include an annular metal rim 10, a hub 20, a plurality of spokes 30, a non-inflatable foam tire 50, and a tire reinforcing unit 40.

As illustrated, the metal rim 10 includes an annular spoke-mounting wall 12, and left and right annular tire-clamping walls 13 which extend radially and outwardly from two opposite sides of the spoke-mounting wall 12 to define a tire-retention groove 14 thereamong.

The hub 20 is disposed coaxially with the spoke-mounting wall 12 of the metal rim 10.

The spokes 30 interconnect the hub 20 and the spoke-mounting wall 12 of the metal rim 10.

The foam tire 50 is disposed in the tire-retention groove 14 of the metal rim 10, and has an annular inner section 501 clamped fixedly by the tire-clamping walls 13, and an annular outer section 502 which projects outwardly and radially from the tire-retention groove 14 of the metal rim 10.

The tire reinforcing unit 40 is embedded within the foam tire 50, and includes an annular non-stretchable strap 42 which is embedded in the inner section 501 of the foam tire 50 and which is disposed around the spoke-mounting wall 12, and a plurality of angularly spaced apart rigid strings 41 which extend radially from the non-stretchable strap 452 into the outer section 502 of the foamed tire 50.

Each of the spokes 30 has an anchor end, in the form of a nut 31, which is disposed in the tire-retention groove 14, which abuts tightly against the spoke-mounting wall 12, and which is formed with a radial through-hole 311. The strap 42 passes fittingly through the through-holes 311 in the anchor ends 31 of the spokes 30.

In the preferred embodiment, the non-stretchable strap 42 is a metal strap, and the rigid strings 41 are metal strings of a cross-section much smaller than that of the strap 42.

Some of the advantages provided by the bicycle wheel assembly 100 according to the present invention are as follows:

1. The extension of the strap 42 through the nuts 31, and the fastening relationship between the strap 42 and the strings 41 enhance the structural strength of the foam tire 50 on the metal rim 10.
2. The foam tire 50 is not deflated due to puncturing when riding over a pointed object.

With this invention thus explained, it is apparent that numerous modifications and variations can be made without departing from the scope and spirit of this invention. It is therefore intended that this invention be limited only as indicated in the appended claims.

I claim:

1. A bicycle wheel assembly comprising:
    an annular metal rim including an annular spoke-mounting wall, and left and right annular tire-clamping walls extending radially and outwardly from two opposite sides of said spoke-mounting wall to define a tire-retention groove thereamong;
    a hub disposed coaxially within said spoke-mounting wall of said metal rim;
    a plurality of spokes interconnecting said hub and said spoke-mounting wall of said metal rim;
    a non-inflatable foam tire disposed in said tire-retention groove of said metal rim, and having an annular inner section clamped fixedly by said tire-clamping walls, and an annular outer section projecting outwardly and radially from said tire-retention groove; and
    a tire reinforcing unit embedded within said foam tire, and including an annular non-stretchable strap embedded in said inner section of said foam tire and disposed around said spoke-mounting wall, and a plurality of angularly spaced apart rigid strings extending radially from said non-stretchable strap into said outer section of said foam tire.

2. The bicycle wheel assembly as defined in claim 1, wherein each of said spokes has an anchor end which is disposed in said tire-retention groove, which abuts tightly against said spoke-mounting wall, and which is formed with a through-hole, said strap passing fittingly through said through-holes in said anchor ends of said spokes.

3. The bicycle wheel assembly as defined in claim 1, wherein said non-stretchable strap is a metal strap, and said rigid strings are metal strings.

* * * * *